United States Patent [19]

Eun

[11] Patent Number: 4,984,263
[45] Date of Patent: Jan. 8, 1991

[54] BREAK-IN METHOD IN A KEY SYSTEM

[75] Inventor: Jin-Pyo Eun, Seoul, Rep. of Korea

[73] Assignee: SamSung Electronics Co., Ltd., Suwon, Rep. of Korea

[21] Appl. No.: 373,950

[22] Filed: Jun. 29, 1989

[30] Foreign Application Priority Data

Jun. 29, 1988 [KR] Rep. of Korea ............... 1988-7931

[51] Int. Cl.$^5$ .................... H04M 1/72; H04M 3/20; H04M 3/56
[52] U.S. Cl. ................................. 379/158; 379/165
[58] Field of Search ............... 379/158, 160, 165, 203, 379/206

[56] References Cited

U.S. PATENT DOCUMENTS 4,821,316 4/1989 Okumura et al. ............... 379/165 X

Primary Examiner—Stafford D. Schreyer
Attorney, Agent, or Firm—Robert E. Bushnell

[57] ABSTRACT

A break-in method and a circuit in a key system for switching a key system to a conference-call state by use of a conference-call circuit is disclosed in the invention. In the break-in method, when an attendant perceives a telephone subscriber on the line, the attendant breaks in forcefully upon the subscriber's call currently on the line, changing the present call to a conference call. Thereafter, if the attendant hangs on the phone, the subscriber having waited for being switched breaks into the conference-call replacing the attendant. To achieve the improved method the inventive subject includes: a microprocessor MPU for controlling the key system; a subscriber circuit SBC for interfacing a state of an extension-line subscriber ST1 to STn with a main system 100; an office line circuit OLC for interfacing office-line codes Co1, Co2 with the main system 100; a switching circuit S/W for providing and switching a line controlling under control microprocessor MPU; a conference-call circuit CFC for providing telephone subscribers with the conference-call operation by means of controlling microprocessor MPU; and a memory MRY for reading and writing data by controlling under control microprocessor MPU.

6 Claims, 2 Drawing Sheets

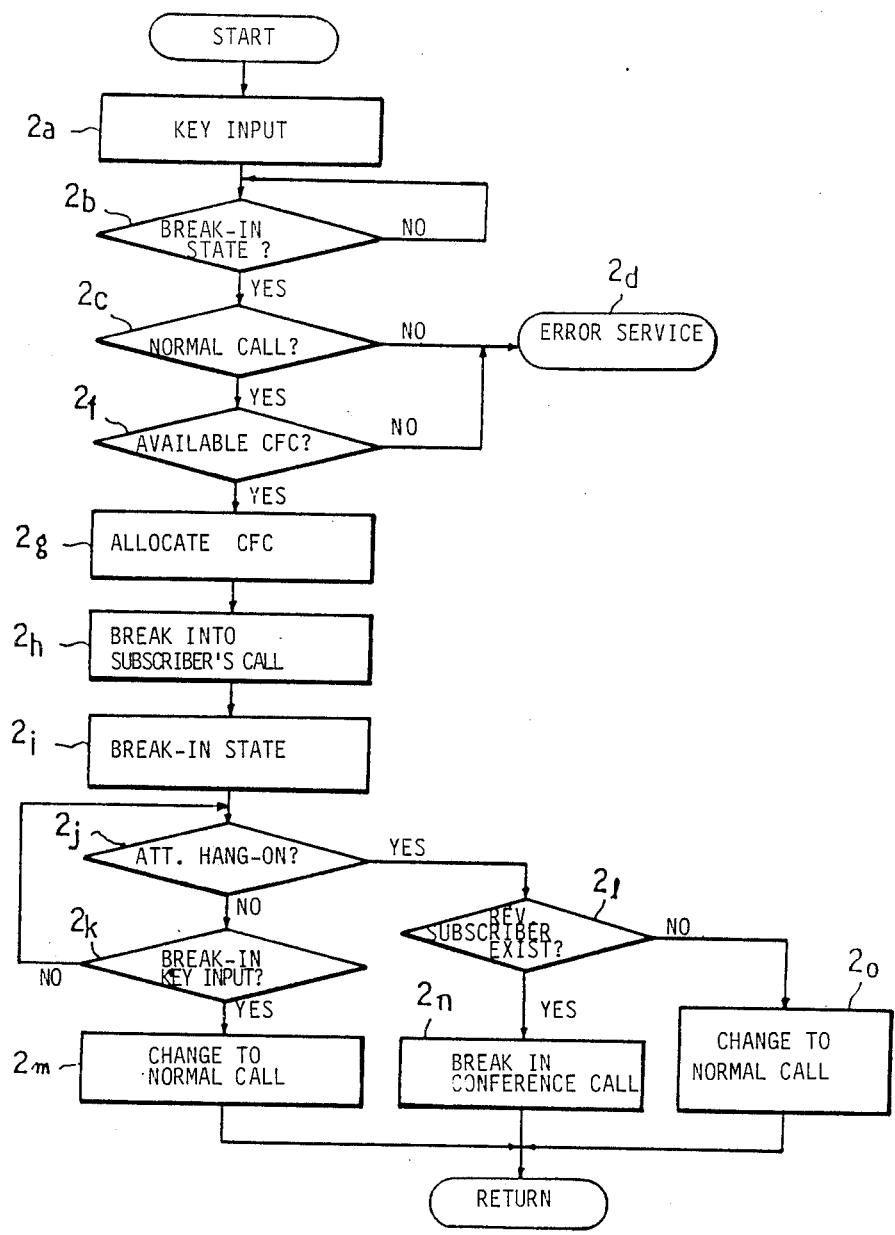
F I G. 2

BREAK-IN METHOD IN A KEY SYSTEM

BACKGROUND OF THE INVENTION

The present invention relates to a break-in method in a key system and, in particular, to a break-in method for switching a key system to a conference-call state by use of a conference-call circuit. In a break-in operation, when an attendant perceives a telephone subscriber on the line, the attendant breaks forcefully into the subscriber's call currently being made, and changes the current the present call to a conference call. Thereafter, if the attendant hangs-up on the phone, the subscriber having waited for being switched breaks into the conference-call replacing the attendant.

In general, a break-in system is used when an attendant wants to make an emergency call to an extension-line subscriber or to connect an urgent office-line call to the extension-line subscriber, and during the operation the present call must be continuously sustained.

However, in a conventional key system, when an attendant breaks into a extension-line subscriber's call, the attendant can only connect the lines, whereas the inventive method allows the subscriber, waiting for being switched, or a reserved subscriber, to break in the conference-call state by use of a conference-call circuit while continuously holding the subscriber's present line.

SUMMARY OF THE INVENTION

It is accordingly an object of the present invention to provide a break-in method and a circuit for use in a key system.

It is another object of the present invention to provide a break-in method and a circuit for breaking into the other party's call with a conference-call state when an attendant dials for an extension-line subscriber or the attendant dials for an extension-line subscriber in order to switch a call presently being made by the attendant, by pushing a break-in key of a key system while hearing a busy tone, the system using a conference-call circuit for supporting the conference-call operation.

According to one aspect of the invention of, to achieve the objects stated above the inventive subject includes: a microprocessor (MPU) for controlling the key system; a subscriber circuit (SBC) for interfacing a state of an extension-line subscriber ST1 to STn with a main system; an office line circuit OLC for interfacing office-line codes Co1, Co2 with said main system; a switching circuit S/W for providing and switching a line by controlling of microprocessor MPU; a conference-call circuit CFC for providing telephone subscribers with the conference-call operation by means of controlling microprocessor MPU; and a memory MRY for reading and writing data by controlling of the microprocessor MPU.

BRIEF DESCRIPTION OF THE DRAWINGS

For a better understanding of the invention and to show how the same may be carried into effect, reference will now be made, by way of example, to the accompanying diagrammatic drawings, in which:

FIG. 2 is a flow chart specifically illustrating the operation of a key system in accordance with the present invention.

DETAILED DESCRIPTION OF THE INVENTION

Figure 1:
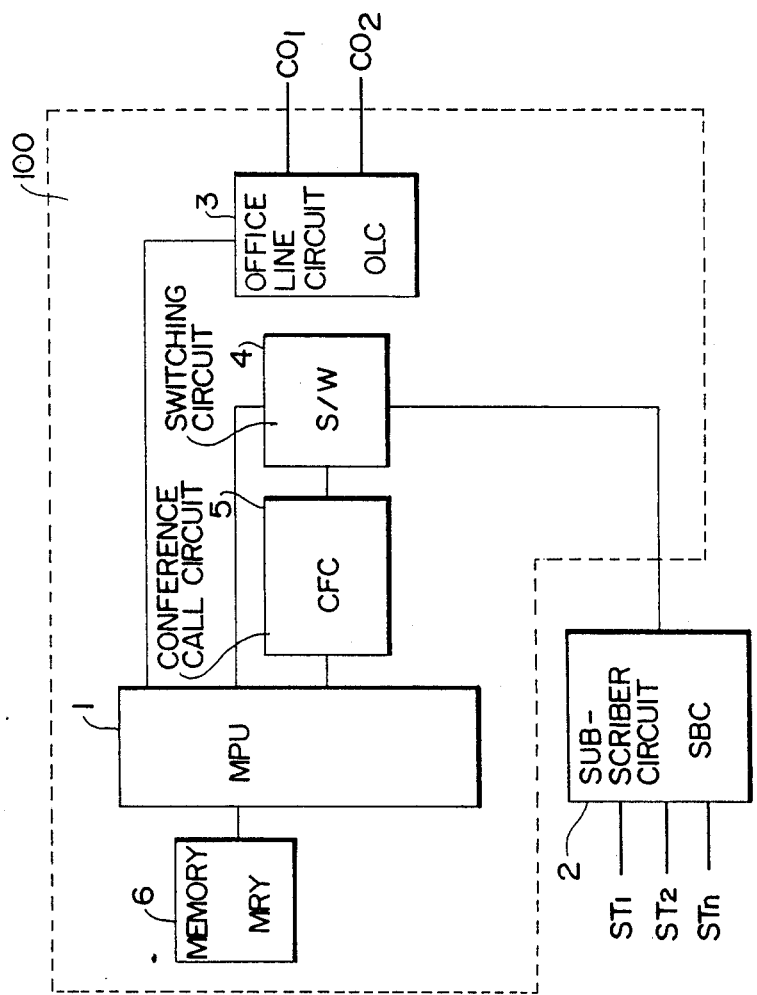
FIG. 1 is a block diagram illustrating diagrammatically a key system in accordance with the present invention.

A preferred embodiment will now be explained in detail with reference to the accompanying drawings.

Referring to FIG. 1, the block diagram shows diagrammatically how the invention operates. The key system as shown in FIG. 1 includes: a microprocessor (MPU) 1 for controlling the key system; a subscriber circuit (SBC) 2 for interfacing a state of an extension-line subscriber ST1 to STn with a main system 100; an office line circuit (OLC) 3 for interfacing office-line codes CO1, CO2 with said main system 100; a switching circuit (S/W) 4 for providing and switching a line by controlling of said microprocessor; a conference-call circuit (CFC) 5 for providing telephone subscribers with the conference-call operation by means of controlling said microprocessor MPU; and a memory (MRY) 6 for reading and writing data by controlling of said microprocessor MPU.

Referring to FIG. 2, the flow chart specifically illustrating the operation of a key system includes a first process for switching the key system to a break-in state, and a second process for recovering from the break-in state when the attendant in the break-in state hangs on the phone, wherein said first process includes the steps of:

checking a normal call state for confirming if the present call is a normal call while hearing a busy tone, when a call is made from an attendant telephone to an extension-line telephone being presently busy or the call being made by the attendant needs switching;

executing an error service when the result of said checking is not for a normal call state, and allocating a conference-call circuit when the result is for a normal call state after checking whether there remains a conference-call circuit available;

intervening into the break-in state by the attendant's breaking into the other party's call with conference-call through the allocated conference-call circuit in said assigning step;

checking if the attendant hung on the telephone in said break-in intervening step;

a first step for checking if a reserved subscriber is present when the result of said hang-on checking is identical to a hang-on state, thereby adding the reserved subscriber to the conference-call state when a subscriber is present, if not, recovering both attendant and subscriber to the previous normal call state; and a second step for checking the break-in key input when it's not in a hang-on state in said attendant hang-on check, thereby, if there is a break-in key input, recovering the call with the other party to the previous normal call state, if not so, checking continuously the attendant hang-on state.

Hereinafter, the preferred embodiment of the invention will be described in detail with reference to the FIG. 1 and FIG. 2. Generally in a software for a key-phone system, each subscriber occupies a given memory region of the memory 6 in FIG. 1 so as to save its call state. For example, a phone number of the other party and the telephone state such as the dialing state of a user, busy-line state, recovering state, reserved subscriber's phone number, etc. are saved in said memory MRY 6. A present state of a user (busy-line state, reserved state and conference-call state are set or reset by bit unit) can be displayed in the memory MRY 6.

Accordingly, the key system can inform the present state of the other party by checking the subscriber's memory, and mixes speech data of subscribers by means of the conference-call circuit CFC 5, thereby transmitting the data to each subscriber through the switching circuit 4. The available conference-call circuit 5 means a circuit not presently being used by other subscribers. When the system is on a 3-day conference call state, the memory 6 saves the three subscriber's numbers.

Therefore, the break-in operation starts working when the break-in key appointed by the system is inputted, after the attendant dials for the extension-line subscriber while hearing a busy tone. Hence, if the break-in key is inputted at a step 2a of FIG. 2 while the attendant hears the busy tone, the microprocessor MPU 1 checks at a step 2b the other party's call state saved in the memory MRY 6.

Thereafter, at a step 2c whether the other party's call is in a normal call state (a call state with one subscriber in the office-line or extension-line) is checked. If the result of said step 2c is not identical to a normal call state, an error service is executed at a step 2d, however if it is identical to a normal call state, whether there is any available conference-call circuit 5 is checked in the memory 6 at a step 2f. If there is not any available conference-call circuit 5 at step 2f, the error service of the step 2d is made, otherwise if there exists an available conference-call circuit 5, the microprocessor 1 allocates at a step 2g a given circuit of the conference-call circuit 5, and saves it in the memory 6 at a step 2h, thereby controlling the switching circuit 4, the office-line circuit 3, and the conference-call circuit 5 so as to intervene into the conference-call state. Therefore, microprocessor 1 sets the system to be in the 3-way conference call state of which state puts said three callers on the same telephone line.

After the system becomes in its conference-call state by executing the break-in operation by the attendant, the system can occasionally come off from the break-in state of a step 2i or hung on by the requirement of the attendant. If the attendant hangs on the phone at a step 2j in the state of 3-way conference-call caused by the break-in operation, the microprocessor MPU checks at a step 21 whether there is a reserved subscriber from the memory 6. When there is not a reserved subscriber, the conference-call circuit 5 is released at a step 2o, causing the other party to be in the previous normal call state. If, however, there is a reserved subscriber, the microprocessor 1 saves a corresponding data in the memory 6 so that the reserved subscriber can break into the conference-call state in a step 2n.

While the attendant is in break-in state, if another break-in key is received at a step 2k, the microprocessor 1 releases at a step 2m the conference-call circuit 5 and controls both of the other party and attendant's call state to be the previous normal call state. Steps 2m, 2o, and 2n will now be additionally explained hereinbelow in detail.

Referring to the step 2m, it shows a case that the attendant dials the phone, then the system executes the break-in operation in case the other party is busy, causing the system to be in the conference-call state. Thereafter, the attendant leaves a message to the other party and hangs on the phone.

The step 2o, being similar to the step 2m, shows a case that the attendant hangs on the phone during the conference-call state, finishing the break-in operation. In this case also, the conference-call circuit 5 is released and the other party can go on calling with its original subscriber.

The step 2n shows a case that the attendant inputs the break-in key to execute the break-in operation while switching an office-line or extension-line subscriber with the other extension-line subscriber, at the instant hearing the busy tone. Thereafter, when the attendant hangs on the phone during the break-in state, the present reserved subscriber takes the attendant's place breaking into the conference-call state, so that the conference-call state keeps its state continuously.

Moreover, it is a known fact that the software of the key system checks each subscriber's state at a interrupt state to detect whether a hook fresh of the system is hooked off. Namely, the hardware checks whether it is a hang-on state, while the software executes the corresponding service when the hand-on state is detected.

As described above, when an attendant wants to break into an extension-line subscriber's call, the attendant can be easily switched to the other party's call by use of the conference-call circuit. So, it is an advantage of the invention that a reserved subscriber can break into the conference-call state directly while maintaining a present call state with the other party.

While the invention has been particularly shown and described with reference to a preferred embodiment, it will be understood by those skilled in the art that modifications i detail may be made without departing from the spirit and scope of the invention.

What is claimed is:

1. A break-in device for use in a key-phone system, comprising:
   microprocessor means for controlling a key system;
   subscriber circuit means for interfacing a state of an extension-line subscriber with a main system;
   office line circuit means for interfacing office-lines with the main system;
   switching means for, under control of said microprocessor, providing and switching extension-line subscribers;
   conference-call circuit means for providing telephone subscribers with conference-call operation by providing a plurality of conference-call circuits under control of said microprocessor; and
   memory means for reading and writing data under control of said microprocessor, and storing current call states of each of said extension-line subscribers;
   whereby said microprocessor, in response to a break-in key input;
   confirms after reception of said break-in key input, whether a current call by a first party is in a normal-call state when a call is made from an attendant telephone to the first party while a telephone line used by the first party is in a busy state;
   executes an error service when the current call is not in a normal-call state;
   determines from said memory means whether one of said conference call circuits is not in current use;
   controls said conference call circuit means and said switching means to designate one of said conference-call circuits as an allocated circuit for a first one of said extension-line subscribers when said current call is in a normal-call state;

intervenes into a break-in state by breaking into a call between the first party and a second party with a conference-call connecting said first one of said extension-line subscribers with said first party and said second party through the allocated circuit;

checks when the attendant telephone is in a hang-on state, whether a reserved subscriber is present, breaks into the present conference-call state when the reserved subscriber is present, and returns both the attendant telephone and reserved subscriber to a normal-call state when the reserved subscriber is present; and checks for break-in key input when the attendant telephone is not in a hang-on state, and upon reception of break-in key input, returns the other party's call to the previous normal-call state, and if there is no break-in key, and checks continuously the attendant hang-on state during an absence of break-in key input.

2. A break-in method for use in a key-phone system having an attendant telephone system, said method comprising:

a normal-call checking process for confirming whether a current call is a normal-call while hearing a busy tone, when a call is made from an attendant telephone to an extension-line telephone while the extension-line telephone is in a busy state, or the current call from the attendant telephone needs switching;

a conference-call allocation process for executing an error service when the result of said checking process is not in a normal-call state, and allocating a conference-call circuit when said result is in a normal-call state, after checking whether there is a conference-call circuit available;

a break-in intervention process for intervening into a break-in state by breaking into another party's call with a conference-call through the allocated conference-call circuit in said allocation process;

an attendant hang-on detection process for checking if the attendant telephone is in a hang-on state in said break-in intervention process;

a first process for checking if a reserved subscriber is present, when the attendant telephone is in a hang-on state according to said hang-on detection process, breaking into the present conference-call state when the reserved subscriber is present, and returning both the attendant telephone and subscriber to a previous normal-call state when the reserved subscriber is present; and a second process for checking the break-in key input when the attendant telephone is not in a hang-on state in said attendant hang-on detection process, and if there is a break-in key input, returning the call with the other party to the previous normal-call state, if there is no break-in key input, checking continuously the attendant hang-on state.

3. A key-phone break-in device, comprising:

interfacing means for providing office-line codes of office lines and states of extension-lines to a main telephone system;

means for switching said extension lines;

circuit means for providing a plurality of conference-call circuits for the extension-lines; and means for controlling said interfacing means, switching means and circuit means in response to said office-line codes and states of the extension-lines, to enable said conference-call operation by, in response to a reception of break-in key input:

confirming after reception of said break-in key input, whether a current call by a first party is in a normal-call state when a call is made from an attendant telephone to the first party while a telephone line used by the first party is in a busy state;

executing an error service when the current call is not in a normal-call state;

determining whether one of said conference call circuits is not in current use;

controlling said switching means and circuit means to designate one of said conference-call circuits as an allocated circuit for a first one of said extension-lines when said current call is in a normal-call state; and intervening into a call between the first party and a second party with a conference-call connecting said first one of said extension-lines with said first party and said second party through the allocated circuit.

4. A break-in method for use in a key phone system having an attendant telephone system, said method comprising:

confirming whether a current call is in a normal-call state when a call is made from an attendant telephone to an extension-line telephone while the extension-line telephone is in a busy state, or the current call from the attendant telephone needs switching;

executing an error service when the current call is not in a normal-call state, and allocating a conference-call circuit when said current call is in a normal-call state, after checking whether there is a conference-call circuit available;

intervening into a break-in state by breaking into another party's call with a conference-call through the allocated conference-call circuit and checking if the attendant telephone is in a hang-on state;

checking if a reserved subscriber is present when the attendant telephone is in a hang-on state, breaking into the present conference-call state when the reserved subscriber is present, and returning both the attendant telephone and subscriber to a previous normal-call state when the reserved subscriber is present; and checking the break-in key input when the attendant telephone is not in a hang-on state, and, if there is a break-in key input, returning the call with the other party to the previous normal-call state, if there is no break-in key input, checking continuously the attendant hang-on state.

5. A break-in method of use in a key-phone system having an attendant telephone system, said method comprising:

confirming whether a current call is in a normal-call state when a call is made from an attendant telephone to an extension-line telephone while the extension-line telephone is in a busy state, or the current call from the attendant telephone needs switching;

executing an error service when the current call is not in a normal call state, and allocating a conference-call circuit when said current call is in a normal-call state, after checking whether there is a conference-call circuit available;

intervening into a break-in state by breaking into another party's call with a conference-call through the allocated conference-call circuit and checking if the attendant telephone is in a hang-on state;

checking if a reserved subscriber is present when the attendant telephone is in a hang-on state, breaking into the present conference-call state when a reserved subscriber is present, and returning both the attendant telephone and subscriber to a previous normal-call state when the reserved subscriber is present; and a second process for checking the break-in key input when the attendant telephone is not in a hang-on state, and if there is a break-in key input, returning the call with the other party to the previous normal call state, if there is no break-in key input, checking continuously the attendant hang-on state.

6. A break-in method for use in a key-phone system having an attendant telephone system, said method comprising:

confirming whether a current call is in a normal-call state when a call is made from an attendant telephone to an extension-line telephone while the extension-line telephone is in a busy state, or the current call from the attendant telephone needs switching;

executing an error service when the current call is not in a normal call state, and allocating a conference-call circuit when said current call is in a normal-call state, after checking whether there is a conference-call circuit available;

intervening into a break-in state by breaking into another party's call with a conference-call through the allocated conference-call circuit and checking if the attendant telephone is in a hang-on state;

checking if a reserved subscriber is present when the attendant telephone is in a hang-on state, breaking into the present conference-call state when the reserved subscriber is present, and returning both the attendant telephone and subscriber to a previous normal-call state when the reserved subscriber is present; and checking the break-in key input when the attendant telephone is not in a hang-on state, and, if there is a break-in key input, returning the call with the other party to the previous normal call state.

* * * * *